(12) United States Patent
Ferrari

(10) Patent No.: US 10,442,114 B2
(45) Date of Patent: Oct. 15, 2019

(54) COMPARTMENTALIZED RESIN PELLETS

(71) Applicant: M & G USA Corporation, Apple Grove, WV (US)

(72) Inventor: Gianluca Ferrari, Portogruaro (IT)

(73) Assignee: APG Polytech, LLC, Wilmington, DE (US)

( * ) Notice: Subject to any disclaimer, the term of this patent is extended or adjusted under 35 U.S.C. 154(b) by 125 days.

(21) Appl. No.: 15/578,878

(22) PCT Filed: Jun. 3, 2016

(86) PCT No.: PCT/US2016/035816
§ 371 (c)(1),
(2) Date: Dec. 1, 2017

(87) PCT Pub. No.: WO2016/196992
PCT Pub. Date: Dec. 8, 2016

(65) Prior Publication Data
US 2019/0217502 A1   Jul. 18, 2019

Related U.S. Application Data

(60) Provisional application No. 62/171,746, filed on Jun. 5, 2015.

(51) Int. Cl.
| | | |
|---|---|---|
| *B29B 9/12* | (2006.01) | |
| *C08G 63/80* | (2006.01) | |
| *C08G 63/85* | (2006.01) | |
| *C08G 63/91* | (2006.01) | |
| *C08K 5/51* | (2006.01) | |
| *C08L 67/02* | (2006.01) | |
| *C08G 63/183* | (2006.01) | |
| *B29B 9/06* | (2006.01) | |
| *B29B 9/16* | (2006.01) | |

(52) U.S. Cl.
CPC ............... *B29B 9/12* (2013.01); *C08G 63/80* (2013.01); *C08G 63/85* (2013.01); *C08G 63/916* (2013.01); *C08K 5/51* (2013.01); *C08L 67/02* (2013.01); *B29B 9/065* (2013.01); *B29B 2009/163* (2013.01); *C08G 63/183* (2013.01); *C08L 2207/53* (2013.01); *C08L 2310/00* (2013.01)

(58) Field of Classification Search
CPC ....................................................... B29B 9/12
See application file for complete search history.

(56) References Cited

U.S. PATENT DOCUMENTS

| | | | | |
|---|---|---|---|---|
| 5,627,218 A | * | 5/1997 | Bradt .................. | B29B 9/06 521/57 |
| 5,656,716 A | * | 8/1997 | Schmidt ................ | C08G 63/85 502/150 |
| 5,747,548 A | * | 5/1998 | Bradt .................. | B29B 9/06 521/57 |
| 7,391,968 B2 | * | 6/2008 | Takato ................. | G02B 25/001 359/345 |
| 7,541,091 B2 | * | 6/2009 | Sisson ................... | C08K 5/098 264/143 |
| 7,550,203 B2 | * | 6/2009 | Ferrari ................. | B29B 9/12 264/143 |
| 7,655,746 B2 | | 2/2010 | Jernigan | |
| 7,816,008 B2 | * | 10/2010 | Ferrari ................. | B29B 9/12 264/143 |
| 7,981,510 B2 | * | 7/2011 | Richardson ........... | B29B 9/12 428/403 |
| 8,231,937 B2 | * | 7/2012 | Richardson ........... | B29B 9/12 427/212 |
| 8,696,960 B2 | * | 4/2014 | Richardson ........... | B29B 9/12 264/143 |
| 8,986,582 B2 | * | 3/2015 | Richardson ........... | B29B 9/12 264/143 |

FOREIGN PATENT DOCUMENTS

EP   2398853 A1   12/2011

* cited by examiner

*Primary Examiner* — Vickey Nerangis
(74) *Attorney, Agent, or Firm* — Edwin A. Sisson, Attorney at Law, LLC; Jeffrey J. Banyas

(57) ABSTRACT

Disclosed herein is a resin pellet and a process to make said resin pellet. The resin pellet comprises a major polyester comprising a catalytic titanium compound, and a minor polyester comprising a phosphorus compound. The major polyester is present in a first compartmentalized zone of the resin pellet and the minor polyester is present in a second compartmentalized zone of the resin pellet.

19 Claims, 5 Drawing Sheets

COMPARTMENTALIZED RESIN PELLETS

PRIORITY AND CROSS REFERENCES

This application claims priority from International Application No. PCT/US2016/035816 filed on 3 Jun. 2016 and U.S. Provisional Application No. 62/171,746 filed on 5 Jun. 2016 the teachings of each of which are incorporated herein by reference in their entirety.

BACKGROUND

U.S. Pat. Nos. 5,627,218, 5,747,548, 7,550,203, 7,816,008, 7,981,510, 7,931,968, 8,231,937, 8,696,960, 8,986,582, and 7,541,091 the teachings of each of which are incorporated herein by reference in their entirety, teach many techniques for manufacturing compartmentalized resin pellets. In one embodiment, there are at least two zones, or regions in the pellet, preferably a core and a sheath.

Titanium catalysts for bottle grade polyesters are well known. They are used to produce exceptionally good colorless clear containers, such as those required for bottled water. However, the significant catalytic effect of titanium also catalyzes the production of acetaldehyde when the polyester resin is extruded and injection molded into the preform. The high amounts of acetaldehyde have limited the use of titanium catalyzed polyesters in water bottles.

Phosphorus compounds for bottle grade polyesters are also well known. They are used to stabilize the polymer and prevent the formation of acetaldehyde. They are typically added to the polyester during the melt polycondensation phase. The ability to retard the formation of acetaldehyde has seen the use of phosphorus compounds grow in bottled water resins.

For example, U.S. Pat. No. 7,655,746, the teachings of which are incorporated herein by reference in their entirety, teaches adding a phosphorus compound (such as an ammonium salt of an oxyphosphorus acid compound containing an oxyphosphorus group) to a polyester composition during melt phase polymerization with a titanium polycondensation catalyst to reduce acetaldehyde. The phosphorus compound is added during melt phase polymerization after the polyester reaches an intrinsic viscosity (It.V.) of at least 0.45 dL/g. After melt phase polymerization the polyester has a final It.V of between 0.7 and 1.2 dL/g.

By adding the phosphorus compound during melt phase polymerization but prior to reaching the final It.V, the phosphorus compound deactivates the titanium polycondensation catalyst during the melt phase polymerization.

Because the titanium polycondensation catalyst is deactivated by the phosphorus compound during melt phase polymerization, the catalytic effect of the titanium compound is reduced or lost which leads to longer polymerization times.

U.S. Pat. No. 7,550,203, the teachings of which are incorporated herein by reference in their entirety, teaches controlling acetaldehyde in a polyester preform by placing an active oxidation catalyst in the core of a compartmentalized pellet to catalyze the reaction of acetaldehyde with oxygen after the preform is manufactured. U.S. Pat. No. 7,550,203 also teaches that certain phosphines act as a catalyst of acetaldehyde with oxygen.

It is desirable to be able to use titanium catalysts with phosphorus stabilizers providing benefits of both components to the bottle water industry. However, this has been historically impossible to the extent desired because the phosphorus compounds deactivate the titanium catalysts making it impossible for them to be used together in one resin pellet. Historically, the molar ratio of titanium to phosphorus had to be strictly controlled within a very narrow range to prevent the phosphorus from deactivating the titanium catalyst, which would have serious consequences for both the melt phase and solid state polymerization.

Non-limiting examples of phosphorus compounds which deactivate the titanium catalyst are those phosphorus compounds comprising phosphorus in an oxidation state higher than −1. There exists therefore, the need to create a polyester resin pellet or process to make a polyester resin pellet that can exploit the significant catalytic effect of titanium compounds and can also allow the injection molded preform from the resin to take advantage of the lower acetaldehyde provided by the phosphorus compounds.

SUMMARY

Disclosed herein is a resin pellet comprising a major polyester comprising a catalytic titanium compound, and a minor polyester comprising a phosphorus compound, wherein the major polyester is present in a first compartmentalized zone and the minor polyester is present in a second compartmentalized zone.

It is further disclosed that the minor polyester may comprise a deactivated titanium compound. It is further disclosed that the titanium from the catalytic titanium compound is present in the major polyester at a level selected from the group consisting of between 2 ppm and 400 ppm, between 2 ppm and 300 ppm, between 2 ppm and 100 ppm, and between 2 ppm and 20 ppm. It is further disclosed that the catalytic titanium compound is selected from the group consisting of titanium alkoxides and their derivatives, titanium complex salts, titanium complexes with hydroxycarboxylic acids, titanium dioxide-silicon dioxide-co-precipitates, and hydrated alkaline or alkaline earth salts-co-titanium dioxide. It is further disclosed that the deactivated titanium compound is selected from the group consisting of titanium alkoxides and their derivatives, titanium complex salts, titanium complexes with hydroxycarboxylic acids, titanium dioxide-silicon dioxide-co-precipitates, and hydrated alkaline or alkaline earth salts-co-titanium dioxide.

It is further disclosed that the phosphorus from the phosphorus compound is present in the minor polyester at a level selected from the group consisting of between 1 ppm and 20000 ppm, between 1 ppm and 10000 ppm, between 1 ppm and 5000 ppm, between 1 ppm and 1000 ppm, between 1 ppm and 700 ppm, between 1 ppm and 500 ppm, between 1 ppm and 300 ppm, between 1 ppm and 200 ppm. It is further disclosed that the phosphorus compound is selected from the group consisting of phosphate acids or esters or combinations thereof, phosphite esters, phosphonic acids or esters or combinations thereof, phosphinic acids or esters or combinations thereof, phosphines which do not catalyze the reaction of acetaldehyde with oxygen, phosphine oxide, and phosphorus pentoxide.

It is further disclosed that the major polyester and the minor polyester are of the same polyester composition. It is further disclosed that the major polyester and the minor polyester comprise at least 90% by weight of the resin pellet.

It is further disclosed that the first compartmentalized zone may be a sheath and the second compartmentalized zone is a core. It is further disclosed that the second compartmentalized zone is a sheath and the first compartmentalized zone is a core. It is further disclosed that the core is encapsulated by the sheath.

It is further disclosed that the first compartmentalized zone is a first layered sheet and the second compartmentalized zone is a second layered sheet. It is further disclosed that the first layered sheet is next to the second layered sheet. It is further disclosed that the first compartmentalized zone and second compartmentalized zone are configured in a side-by-side configuration whereby neither compartmentalized zone surrounds the other compartmentalized zone in any plane of the pellet.

In one embodiment, the resin pellet further comprises a third compartmentalized zone wherein the first compartmentalized zone is a first layered sheet, the second compartmentalized zone is a second layered sheet, the third compartmentalized zone is a third layered sheet, the minor polyester is present in the second compartmentalized zone and the major polyester is present in the first compartmentalized zone and the third compartmentalized zone. It is further disclosed that the second layered sheet is between the first layered sheet and the third layered sheet.

It is further disclosed that the first compartmentalized zone is void of any deactivated titanium compound. It is further disclosed that the first compartmentalized zone is void of any phosphorus compound.

Also disclosed in this specification is a process for maintaining the catalytic activity of a catalytic titanium compound in a polyester resin during polymerization. The process comprises the steps of:
A. melt phase polymerizing a first polyester comprising the catalytic titanium compound in the absence of a deactivating amount of a phosphorus compound,
B. manufacturing a compartmentalized pellet comprising a first compartmentalized zone and a second compartmentalized zone wherein the first compartmentalized zone comprises the first polyester and the second compartmentalized zone comprises a second polyester comprising a phosphorus compound,
C. blending the compartmentalized resin pellet into an article by melt mixing and making an article.

It is further disclosed that the amount of phosphorus from the phosphorus compound to the amount of titanium from the catalytic titanium compound in step A of the process is in a mole ratio selected from the group consisting of at least 0.1:1.0, at least 0.2:1.0, at least 0.5:1.0, at least 0.7:1.0 and at least 1.0:1.0.

DETAILED DESCRIPTION

Figure 1:
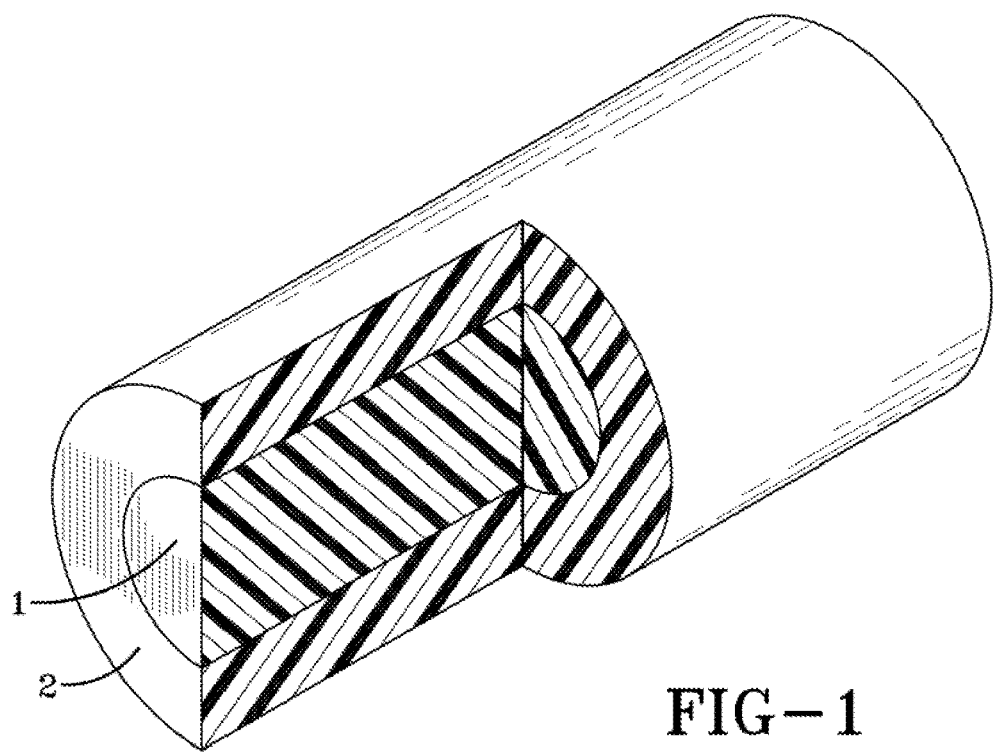
FIG. 1 depicts a resin pellet with two compartments or zones in the core-sheath configuration.

Disclosed herein is an improved polyester resin pellet, and a process to create a preform which exploits the significant catalytic effect of titanium compounds throughout polymerization and also allow for the injection molded preform from the resin pellet to take advantage of the lower acetaldehyde provided by the phosphorus compounds which deactivate the titanium catalyst during extrusion thus reducing or preventing the titanium catalytic formation of the acetaldehyde.

Titanium compounds have been used as a catalyst in manufacturing thermoplastic polyesters for use in packaging applications. Titanium compounds that are capable of catalyzing the polyester reaction are called catalytic titanium compounds.

Phosphorus compounds are important to the polyester as they stabilize the polyester from degrading and producing a yellow color and acetaldehyde when the polyester is exposed to heat and shear, such as during extrusion and injection molding.

However, when the catalytic titanium compound is mixed with a phosphorus compound, such as during polycondensation, the catalytic titanium compound will become deactivated by the phosphorus compound. Once deactivated, the catalytic compound is no longer a catalytic titanium compound as it is incapable of catalyzing the polyester reaction.

What the inventors have found is that the catalytic titanium compound can be separated from the phosphorus compound using the compartmentalized pellet, thereby preventing the phosphorus compound from deactivating the catalytic titanium compound until the resin components are melt mixed during extrusion.

In the compartmentalized resin pellet, a first compartmentalized zone of the pellet comprises a major polyester while a second compartmentalized zone of the pellet comprises a minor polyester. As the major polyester is made (i.e. melt phase polymerized and solid state polymerized) using the catalytic titanium compound, the catalytic titanium compound will be present in the major polyester. The major polyester is preferentially void of a phosphorus compound, but small amounts of a phosphorus compound may be present in the major polyester provided that the phosphorus compound is not present in the major polyester at a level that will deactivate all of the catalytic titanium compound.

The titanium from the catalytic titanium compound will be present in the major polyester at a level selected from the group consisting of between 2 ppm and 400 ppm, between 2 ppm and 300 ppm, between 2 ppm and 100 ppm, and between 2 ppm and 20 ppm. The catalytic titanium compound can be selected from the group consisting of titanium alkoxides and their derivatives, titanium complex salts, titanium complexes with hydroxycarboxylic acids, titanium dioxide-silicon dioxide-co-precipitates, and hydrated alkaline or alkaline earth salts-co-titanium dioxide. Specific examples include tetra-(2-ethylhexyl)-titanate, tetrastearyl titanate, diisopropoxy-bis(acetyl-acetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are tetrabutyltitanate and tetraisopropyltitanate.

Preferably, the phosphorus from the phosphorus compound will be present in the minor polyester at a level selected from the group consisting of between 1 ppm and 20000 ppm, between 1 ppm and 10000 ppm, between 1 ppm and 5000 ppm, between 1 ppm and 1000 ppm, between 1 ppm and 700 ppm, between 1 ppm and 500 ppm, between 1 ppm and 300 ppm, between 1 ppm and 200 ppm. U.S. Pat.

No. 8,063,124 B2, the teachings of which are incorporated herein by reference in their entirety, describes a non-limiting group of phosphorus compounds which may be suitable for use in the minor polyester. Preferably, the phosphorus compound is selected from the group consisting of phosphate acids or esters or combinations thereof, phosphite esters, phosphonic acids or esters or combinations thereof, phosphinic acids or esters or combinations thereof, phosphines which do not catalyze the reaction of acetaldehyde with oxygen, phosphine oxide, and phosphorus pentoxide. Preferably, the ratio of the total amount of phosphorous ions in the resin pellet to the total amount of titanium ions in the resin pellet is greater than 4:3.

In order to deactivate the titanium compound during melt mixing, i.e. during melt extrusion or injection molding, it is preferred that the amount of phosphorus from the phosphorus compound relative to the amount of titanium from the catalytic titanium compound is in a mole ratio of at least 0.1:1.0, with a mole ratio of at least 0.2:1.0 being more preferred, a mole ratio of at least 0.5:1.0 being even more preferred, a mole ratio of at least 0.5:1.0 being still more preferred, with a mole ratio of at least 1.0:1.0 being most preferred.

The minor polyester comprising the phosphorus compound may contain a titanium compound, however the titanium compound that is present in the minor polyester comprising the phosphorus compound is a deactivated titanium compound due to the presence of the phosphorus compound. If enough phosphorus compound is present in the minor polyester, all of the titanium compound, if present in the minor polyester, is a deactivated titanium compound. In a preferred embodiment, the minor polyester is void of a polyamide.

U.S. Pat. Nos. 5,627,218, 5,747,548, 7,550,203, 7,816,008, 7,981,510, 7,931,968, 8,231,937, 8,696,960, 8,986,582, and 7,541,091 teach many techniques for manufacturing compartmentalized resin pellets. In one embodiment, there are at least two compartmentalized zones, or regions in the pellet, preferably a core and a sheath. In this, and all subsequent embodiments, the core-sheath with the sealed ends, as taught by U.S. Pat. No. 6,669,986, the teachings of which are incorporated herein by reference in their entirety, is a preferred resin pellet structure. In one embodiment, the compartmentalized resin pellet comprises a first compartmentalized zone, a second compartmentalized zone and an optional third compartmentalized zone.

The core-sheath structure having two compartmentalized zones as depicted in FIG. 1 is obtained using two feeders. If a third compartmentalized zone is desired, an additional feeder is required. The feeder could be an extruder or a gear pump discharging the polymer from a melt reactor. Any suitable device which can force polymer into a nozzle will work. The first feeder supplies the liquid feed forming the core material 1 which is linearly extruded at the center of the strand. At the same time, the sheath material 2 is extruded in the second feeder into the sheath layer which concentrically covers the core. The core material may be the material in the first compartmentalized zone or the material in the second compartmentalized zone. The sheath material may be the material in the first compartmentalized zone or the material in the second compartmentalized zone. U.S. Pat. No. 6,669,986 discloses a multiple hole die apparatus to manufacture a core-sheath pellet.

Figure 2:
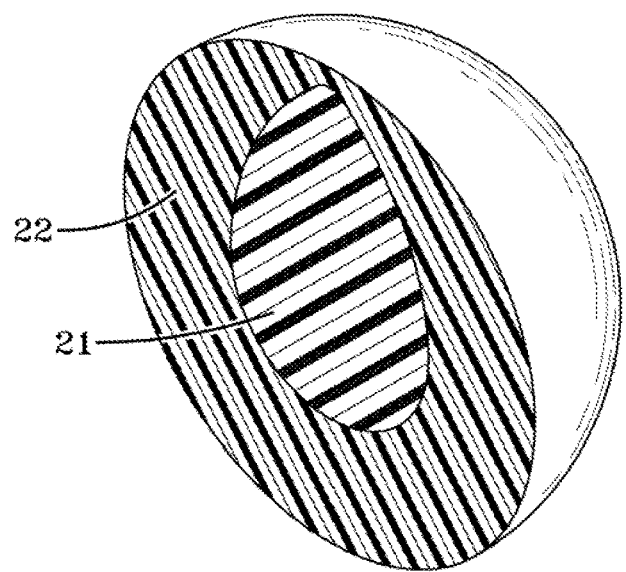
FIG. 2 depicts a resin pellet with two compartments or zones in the core-sheath configuration where the core is encapsulated, surrounded, or enclosed by an outer sheath layer.

A preferred embodiment as depicted in FIG. 2, is to close the ends of the pellet so the inner core 21 is completely surrounded and enclosed by a sheath 22. U.S. Pat. No. 6,669,986 teaches that this spherical or elliptical or disk-form multilayer pellet with the overall circumference including the end face of the core material coated with sheath material can be made by rounding the cut end face. One way to make a compartmentalized resin pellet with an outer layer sheath that encloses the contents of the inner layers is made by cutting the resin pellet strand next to the die underwater.

Figure 4:
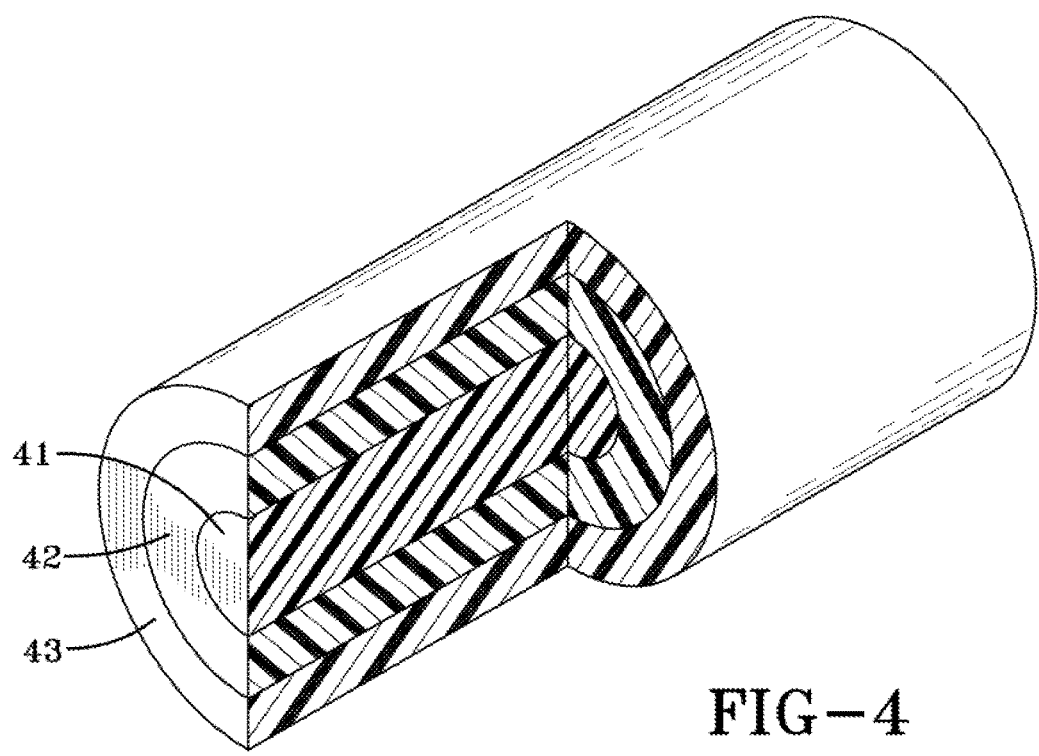
FIG. 4 depicts a resin pellet of three compartmentalized zones configured in two concentric layers surrounding a core.

It is apparent to one skilled in the art that the strand could consist of more than two compartmentalized zones. This would be accomplished by using another feeder and a different die. FIG. 4 depicts this pellet having three compartmentalized zones having a core 41 (the second zone) wherein the core is encased by an intermediate layer 42 (the third zone), which is in turn surrounded by an outer layer 43 (the first zone).

The first step is to extrusion form a multilayer strand. The minor polyester is fed in the center of the strand and the major polyester is extruded around the minor polyester. The extrusion-formed multilayer strand is cut before or after it is cooled as required and formed into multilayer resin pellets.

For cooling, a general cooling means is adopted. For example, a method for immersing the multilayer strand into cooling water in the water tank is adopted. The water-cooled multilayer strand is preferably sent to the cutter after moisture adhering to the surface is removed by a water dripping device.

The cutter cuts the multilayer strand into a specified length by driving a rotary knife, or the like. By cutting the multilayer strand as it is, double columnar form multilayer pellets comprising a minor polyester core and a major polyester sheath are obtained.

In general, multilayer resin pellets with an outside diameter of about 2 to 8 mm are manufactured.

Figure 3:
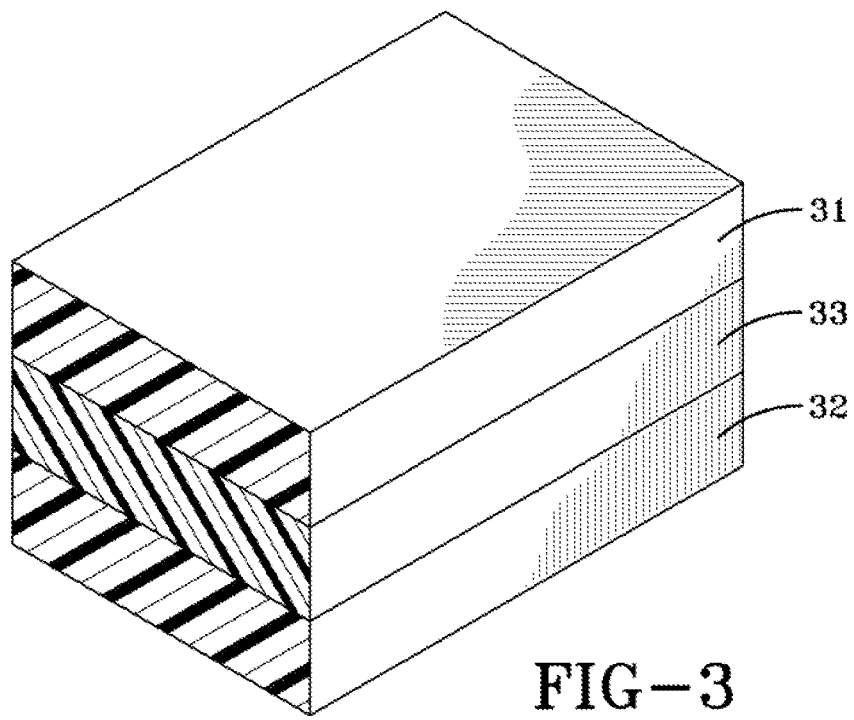
FIG. 3 depicts a resin pellet with three compartments or zones in a multi-layered or sandwich configuration.

In another embodiment, the major polyester and the minor polyester can be cast into layered sheets that are then cut in a cube form. The minimum structure is two layers, but the preferred structure for a cast structure of this invention is a sandwich structure as depicted in FIG. 3. In the sandwich or layered construction there are at least three compartmentalized zones wherein the middle layer 33 is the second compartmentalized zone comprising the minor polyester sandwiched between a first outer layer 31 (the first compartmentalized zone comprising the major polyester) and a second outer layer 32 (the third compartmentalized zone also comprising the major polyester).

The core zone or compartment is a compartment of which a portion lies between the centroid of the resin pellet and the zone with the greatest exposed surface that touches the air. The centroid of the resin pellet is the center of the plane passing through the resin pellet perpendicular to the extrusion direction of the strand from which the resin pellet is cut. Usually this will be the longest dimension of the resin pellet. It should be obvious that for the sphere, any plane will suffice.

Figure 5A:
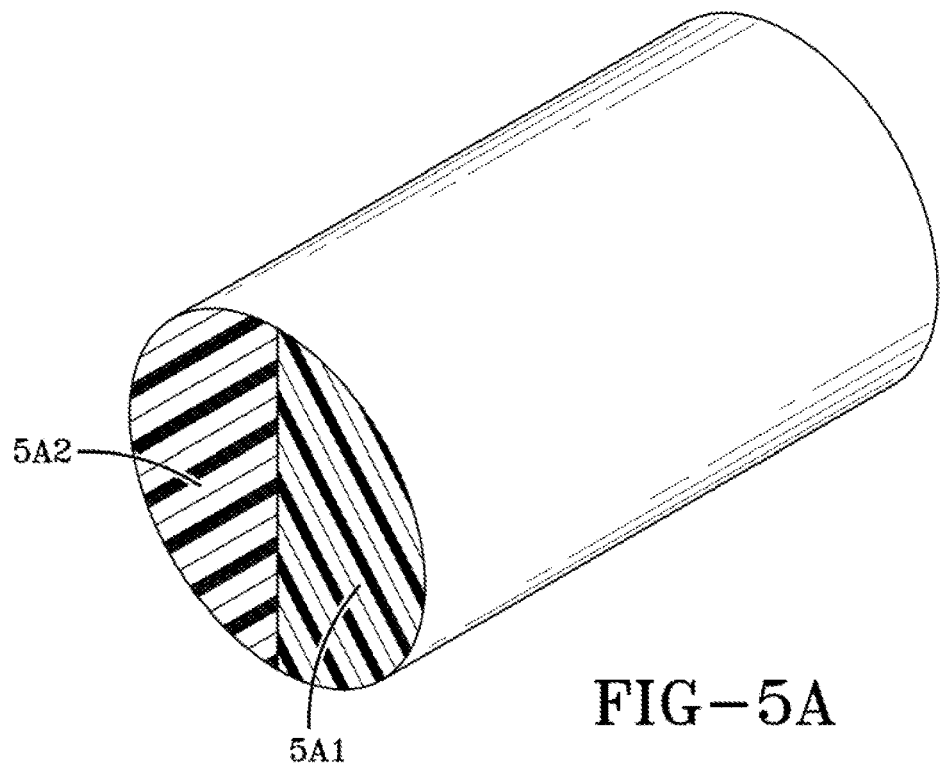
FIGS. 5A, 5B and 5C depict examples of various resin pellet configurations of two compartments, where the compartments lay beside each other in what is called the side-by-side configuration.
Figure 5B:
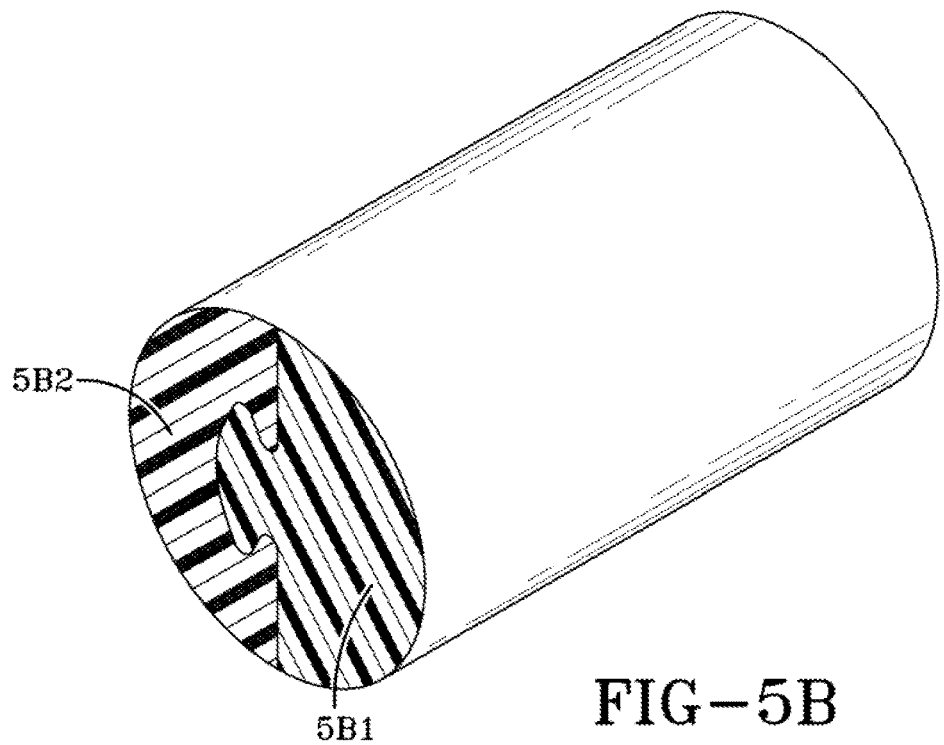
Figure 5C:
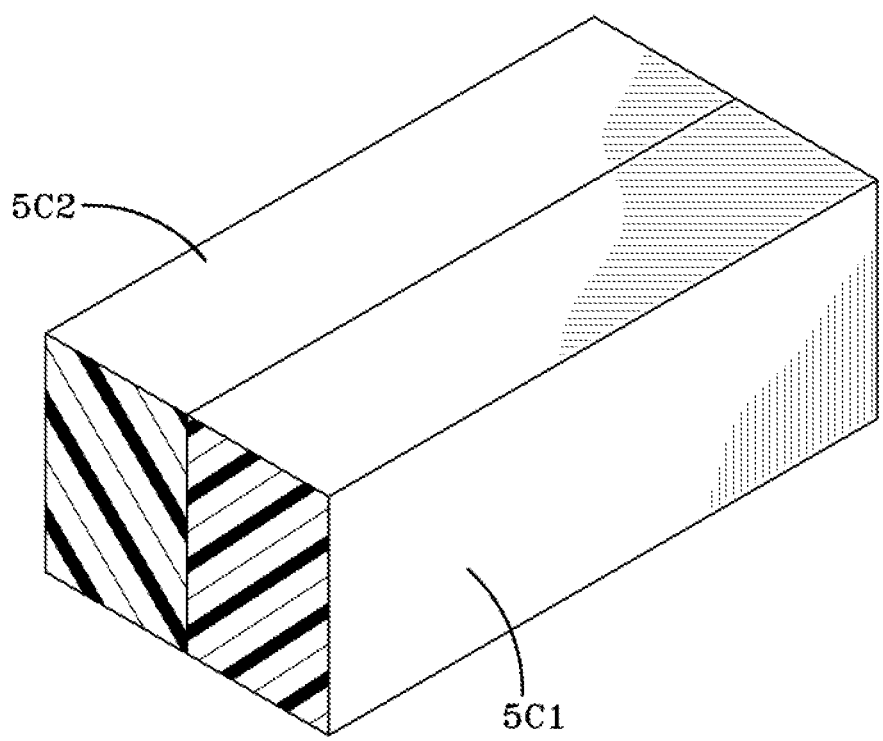
Figure 6:
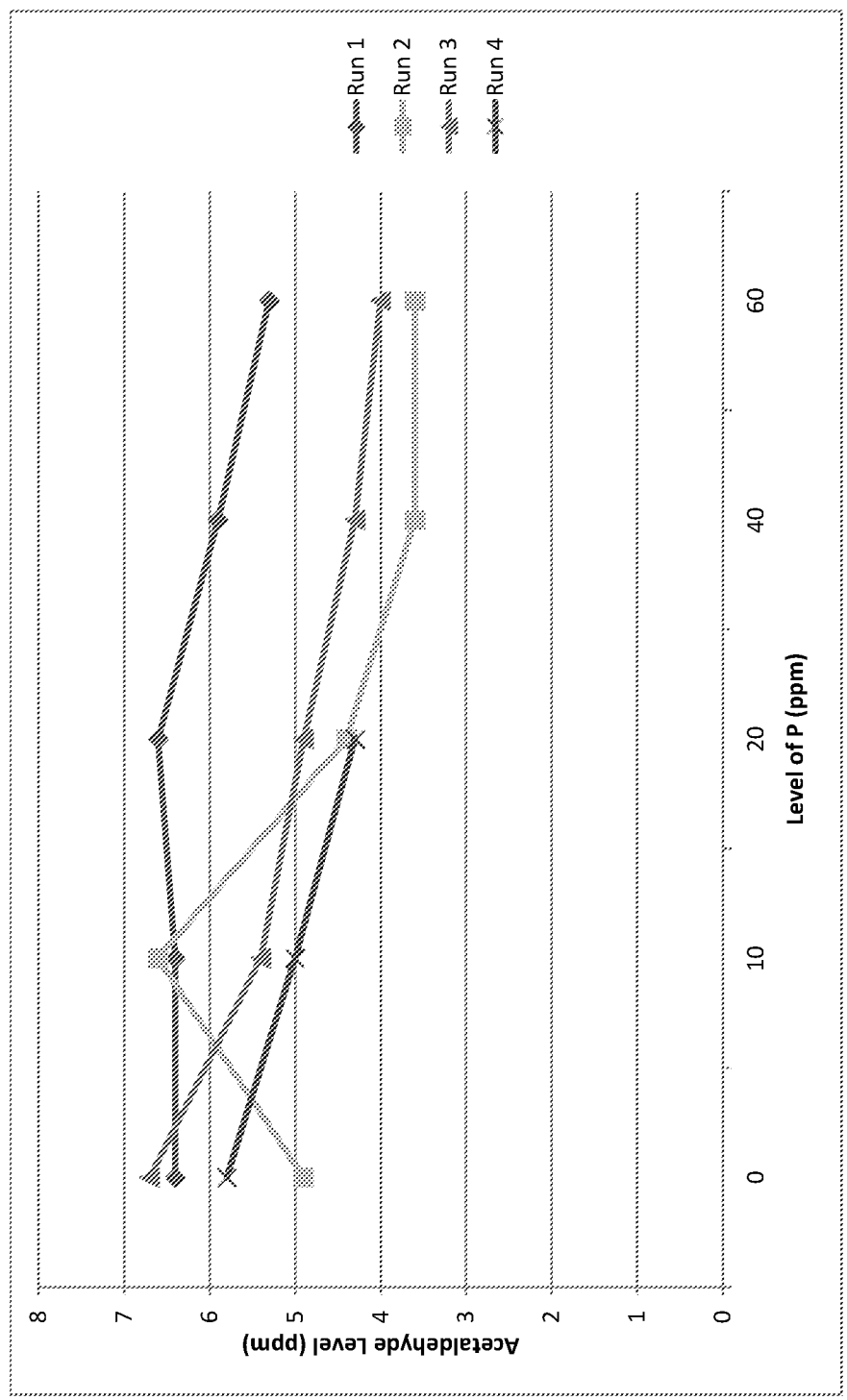
FIG. 6 depicts a chart of the acetaldehyde levels of the various compositions reported in the examples section herein.

FIGS. 5A, 5B, and 5C show non-limiting variations of the side-by-side configuration, which are intended to show the configuration of the side-by-side variations and not necessarily the proportions of the major and minor polyesters. In the side-by-side configuration depicted in FIGS. 5A, 5B, and 5C, the first compartmentalized zone (5A1, 5B1 and 5C1 respectively) is placed next to the second compartmentalized zone (5A2, 5B2 and 5C2 respectively). A distinguishing feature of the side-by-side configuration is that unlike the annular, core-sheath, or encapsulated configurations, in the side-by-side configuration, neither compartmentalized zone surrounds the other compartmentalized zone in any imaginary plane drawn through the resin pellet.

As shown in FIG. 3 and FIGS. 5A, 5B, and 5C, it should be apparent that these structures meet the above criteria. There is no plane passing through the pellet, in any direction which would contain both compartmentalized zones and have one compartmentalized zone completely surround the other compartmentalized zone.

The co-extruded side-by-side stranded pellet is the same structure as the two layer side-by-side sheet cut into the cube, the only difference being the manufacturing route.

The compartmentalized zones can be classified as a first compartmentalized zone, a second compartmentalized zone, and sequentially labeled with each increasing compartmentalized zone number. For instance, a core-sheath design has a minimum of two compartmentalized zones. The core sheath design could have more zones depending upon the number of concentric rings. The side-by-side could also have sheath surrounding two side-by-side configurations.

The size of the compartmentalized zone distinguishes it from a zone associated with a homogenous dispersion. The homogenous dispersion creates zones, but they are finely divided with each zone representing a very small percentage of the total volume of the resin pellet. The compartmentalized zone will be a much greater percentage of the total volume.

This is easily demonstrated using the core sheath shown in FIG. 1. The percentage of the volume of the second compartmentalized zone (core) relative to the whole pellet is the ratio of the diameter of the core to the diameter of the cylindrical portion of the pellet. The ratio of the radii works just as well. This ratio can be estimated by looking at the extrusion die and using the ratio of the diameters of the holes casting the strand. The actual ratio can be measured by SEM (scanning electron microscopy), microscopic examination, or separation of the components and calculating the required volume associated with the density adjusted weight of the recovered components.

To be a compartmentalized zone, the volume of the zone must be at least 0.001 percent of the total volume of the pellet. In practicality, 0.01 volume percent is more preferred, with at least 0.1 volume percent the most preferred.

The higher molecular weight polycondensation polymers are traditionally manufactured in a two step process. The melt process converts the raw materials to low molecular weight oligomers and then raises the molecular weight oligomers to a polymer by removing the reaction by-products from the liquid. The molecular weight, or intrinsic viscosity, is increased until the melt viscosity reaches the point where it is too physically or economically difficult to transport the liquid or rejuvenate the liquid surface for by-product removal. At this point the polymer is solidified into and cut into small granules, or chips, all of which are known as chips. The chips are then subjected to solid phase polymerization which increases the molecular weight of the material in the chip by exposing the chip to a temperature below the melt point of the polymer and an external driving force such as vacuum or inert gas. Typically, the temperature ranges from 140° C. to 1° C. below the temperature at which the chip becomes liquid, or the polymer melts.

The conventional chip as produced from the melt phase polymerization or extruder is homogenous with a very narrow molecular weight distribution (small I.V. gradient). The skin of the chip has the same molecular weight as the center of the chip. The intrachip intrinsic viscosity and subsequent melt viscosity variation can be determined by the tests described below which measure intrachip intrinsic viscosity variation.

In solid phase polymerization, the reaction by-products diffuse through the chip and then escape from the skin into an inert gas or vacuum. It has even been proposed that air be used as the driving force. Air is not preferred because the presence of the oxygen creates a competing reaction that degrades the surface melt viscosity and causes color in the polymer.

In one embodiment, the process does not use the compartmentalized pellet, but instead uses a masterbatch of a polyester resin containing a phosphorus compound to deactivate the catalytic titanium compound during melt extrusion/injection molding. When the masterbatch is used, it is preferred that the masterbatch has been solid state polymerized. Preferably, the solid state polymerization takes place at a temperature in a range selected from the group consisting of between 180° C. and 250° C., between 190° C. and 240° C., and between 200° C. and 230° C. with the only limitation being that the solid state polymerization temperature is below the melt point of the polyester resin. Preferably, the solid state polymerization takes place for a time in a range selected from the group consisting of between 2 hours and 8 hours, between 3 hours and 7 hours, and between 4 hour and 6 hours.

The words chip, pellet and particle are used interchangeably. Preferred forms and/or sizes of for the chips are spherical with preferred diameters of 0.05 cm to 0.3 cm, hemispherical with a preferred maximum cross section of 0.1 cm to 0.6 cm, or right circular cylinders with a preferred diameter of 0.05 mm to 0.3 mm and a length of 0.1 cm to 0.6 cm. The chip is not to be confused with a fiber, which will have a large aspect ratio (long strand to diameter) of at least 15, with the aspect ratio of the chip being less than 15, more preferably less than 10.

Suitable thermoplastic polymers for use in the present invention include any crystallizable thermoplastic homopolymer or copolymer. The term crystallizable means that the thermoplastic polymer can be become semi-crystalline, either through orientation or heat induced crystallinity. It is well known that no plastic is completely crystalline and that the crystalline forms are more accurately described as semi-crystalline. The term semi-crystalline is well known in the prior art and is meant to describe a polymer that exhibits X-ray patterns that have sharp features of crystalline regions and diffuse features characteristic of amorphous regions. It is also well known in the art that semi-crystalline should be distinguished from the pure crystalline and amorphous states.

A crystallizable polymer will form crystals when the polymer is gradually cooled from the molten state. These crystals will generate diffraction observable by X-ray.

Preferably, the thermoplastic polymers used in the present invention comprise a polyester polymer which means a homopolymer or copolymer such as polyethylene terephthalate or crystallizable copolymer of polyethylene terephthalate. For clarity, the terms crystallizable polyethylene terephthalate, group consisting of crystallizable polyethylene terephthalates, refers to polymers which are crystallizable and comprised of at least 85% polyethylene terephthalate repeating segments. The remaining 15% may be any other combination of acid-glycol repeating units, provided that the resulting polymer is capable of achieving a degree of crystallinity of at least 5%, more preferably 10%.

The term crystallizable polyester refers to polymer which is crystallizable and at least 85% of its acid moieties are selected from the group consisting of terephthalic acid, 2,6 naphthalene dicarboxylic acid or their respective di-methyl esters.

In the preferred embodiment, the high and low melt viscosity materials are similar. Similar does not mean an exact formula replica. For example, a crystallizable polyethylene terephthalate homopolymer (100% of the repeating units being ethylene-terephthalate) could be placed in the core and a crystallizable polyethylene terephthalate copolymer (85 to almost 100% of the repeating units being ethylene-terephthalate and the remainder of the repeating units modified with different glycol-acid repeating units) placed into the sheath. The possible glycols include but are not limited to cyclohexane dimethanol, ethylene glycol, butane diol and the possible acids include but are not limited to isophthalic acid, 2, 6 naphthalene dicarboxylic acid, sebacic acid or azelaic acid. Of course mixtures of the previous combinations are also envisioned.

While one preferred embodiment is a crystallizable polyethylene terephthalate homopolymer, the solution discussed herein can also be used for non-crystallizable polyesters such as polyethylene terephthalate modified with 1,4-cyclohexanedimethanol (CHDM), 2,2,4,4-tetramethyl-1,3-cyclobutanediol and isomers thereof, and combinations thereof.

For clarity, the use of the term polymer repeat unit refers the chemical structure which forms the main pattern of the reaction. For example, for polyesters, the unit is chemical structure formed by the reaction of the di-acid with the di-glycol. Therefore for polyethylene terephthalate, the repeating unit is the reaction product of terephthalic acid with ethylene glycol, or ethylene terephthalate. Often referred to as the "mer" from the word poly"mer", the repeating unit does not have the functional end groups attached as it has already been reacted into the polymer chain.

Specifically contemplated is that the high melt viscosity core comprise recycled industrial or postconsumer recycled polyester. Such material is often derived from used soft drink bottles and is commercially available throughout the world. To be recycled, the material has to have existed as a solid at least once prior to being extruded into the core. A core of postconsumer recycled polyester would be of variable composition representative of the resin used in packages at the time and would therefore contain a mixture of the various packaging polyesters in the market place.

While it is preferred that the core be void of non-crystallizable polyesters, it is possible that the postconsumer polyester may contain some limited amounts of non-crystallizable polyester. This presents little problem however as when the core is manufactured the crystallizable and non-crystallizable resins react with each other to create a crystallizable core composition. There exists therefore postconsumer recycled polyester void of non-crystallizable polyester and postconsumer recycled polyester containing non-crystallizable polyester. However, the postconsumer or industrial recycled polyester composition must still be crystallizable to be considered part of this invention.

A special type of postconsumer recycled polyester is the type known as FDA regulated postconsumer recycled polyester. The FDA is the United States Food and Drug Administration and is charged with promulgating regulations governing the use of plastics in food packaging. FDA regulated means that the postconsumer recycled polyester complies with the FDA regulations governing the use of the plastic in food and beverage packaging prior to being placed into the compartmentalized chip. To comply with the FDA regulations the resin must be of a suitable purity for use in food packaging as required with the Food Drug and Cosmetic Act as amended and implementing regulations. Some postconsumer recycled polyesters are manufactured using process that have been reviewed by the FDA and the FDA has issued that it judges the material from that process to be of suitable purity in accordance with 21 C.F.R 174.5, provided that it otherwise complies with 21 C.F.R 177.1630. This is often referred to as a "letter of no objection". These postconsumer recycled polyesters are also considered meeting the limitation of being FDA regulated and would be considered FDA regulated postconsumer recycled polyesters. It is important to understand that a regulated recycled postconsumer polyester can meet the requirements and be FDA regulated for the purposes of this specification and not have a "letter of no objection" as to the process used to clean the polyester.

It will be understood that the thermoplastic polymer suitable for use in the present invention can be made into a film, sheet, or injection molded article. The present invention is not limited to chips made from strands. For example, as revealed in U.S. Pat. No. 5,627,218, the thermoplastic polymers can be made into layered sheets that are then cut in a cube form as well. While the layered sheet structure may not work as well as the core—sheath construction, it is expected that placing the higher molecular weight material into a center layer would reduce the overall melt viscosity of the chips.

Polymers employed in the present invention can be prepared by conventional polymerization procedures well known in the art. The polyester polymers and copolymers may be prepared by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. For clarity, a polymer of terephthalate, isophthalate and naphthalate with ethylene glycol, diethylene glycol and cyclohexanedimethanol contains six distinct monomers and is considered a copolymer. The diversity of the repeat units depends on the number of different types of monomers present in the initial polymerization reaction. In the case of polyesters, copolymers include reacting one or more diols with a diacid or multiple diacids, and are sometimes also referred to as terpolymers.

Suitable dicarboxylic acids include those comprising from about 6 to about 40 carbon atoms. Specific dicarboxylic acids include, but are not limited to, terephthalic acid, isophthalic acid, 2,6 naphthalene dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, furan-2,5-dicarboxylic acid and the like. Specific esters include, but are not limited to, phthalic esters and naphthalic diesters.

These acids or esters may be reacted with an aliphatic diol having from about 2 to about 10 carbon atoms, a cycloaliphatic diol having from about 7 to about 14 carbon atoms, an aromatic diol having from about 6 to about 15 carbon atoms, or a glycol ether having from 4 to 10 carbon atoms. Suitable diols include, but are not limited to, 1,4-butandiol, ethylene glycol, 1,4-butenediol, trimethylene glycol, 1,6-hexanediol, 1,4-cyclohexanedimethanol, diethylene glycol, resorcinol, 1,3-propanediol, neophenthyl glycol, isosorbide, 2,2,4,4-tetramethyl-1,3-cyclobutanediol (TMCD) and hydroquinone.

Polyfunctional comonomers can also be used, typically in amounts of from about 0.1 to about 3 mole percent. Suitable comonomers include, but are not limited to, trimellitic anhydride, trimethylopropane, pyromellitic dianhydride (PMDA), and pentaerythritol. Polyester-forming polyacids or polyols can also be used. It is also possible to vary the rate of solid phase polymerization of one of the zones or compartments by placing the different levels of the polyfunctional comonomer into different zones.

One preferred polyester is selected from the group consisting of polyethylene terephthalate formed from the approximate 1:1 stoichiometric reaction of terephthalic acid, or its ester, with ethylene glycol. Another preferred polyester is selected from the group consisting of polyethylene naphthalate formed from the approximate 1:1 to 1:1.6 stoichiometric reaction of naphthalene dicarboxylic acid, or its ester, with ethylene glycol. Polybutylene terephthalate (PBT) is another preferred polyester. PET copolymers, PEN copolymers, and PBT copolymers are also preferred. Specific co- and terpolymers of interest are PET with combinations of isophthalic acid or its diester, 2,6 naphthalene dicarboxylic acid or its diester, and/or cyclohexane dimethanol.

The melt phase polymerization described above may be followed by a crystallization step and then a solid phase polymerization (SSP) step to increase the molecular weight, as measured by intrinsic viscosity. The crystallization and polymerization can be performed in a tumbler dryer reaction in a batch-type system. Alternatively, the crystallization and polymerization can be accomplished in a continuous solid phase process whereby the polymer flows from one vessel to another after its predetermined thermal treatment in each vessel.

The crystallization conditions preferably include a temperature of from about 100° C. to about 150° C. The solid phase polymerization conditions preferably include a temperature of from about 200° C. to about 232° C., and more preferably from about 215° C. to about 232° C. The solid phase polymerization may be carried out for a time sufficient to raise the molecular weight to the desired level, which will depend upon the application. For a typical bottle application, the preferred molecular weight corresponds to an intrinsic viscosity from about 0.65 to about 1.0 deciliter/gram, as determined by ASTM D-4603-86 at 30° C. in a 60/40 by weight mixture of phenol and tetrachloroethane. The time required to reach this molecular weight may range from about 8 to about 45 hours.

In one embodiment, the chip can be made by extruding the core of a polymer strand from a crystallizable polyethylene terephthalate of 0.65 dl/g and extruding a sheath over the core from 95 to 5 percent by weight of the strand of a polyester prepolymer of 0.48 dl/g. The strand is then cut into solid core-sheath chips.

In another embodiment, the core can be derived from postconsumer recycled polyester. The important factor is that the melt viscosity of the polymer in the core be greater than the melt viscosity of the polymer in the sheath.

As demonstrated in the experimental data, the effect becomes less dramatic when less material is blended or placed into the core or the I.V. becomes closer to the I.V. of major composition.

The benefit of keeping the titanium separate from the phosphorus is that the polyester resin in the first zone (the majority of the polyester in the pellet) can be manufactured (i.e. melt phase polymerized and solid state polymerized) using the titanium catalyst during the complete polymerization cycle and then the titanium catalyst can be deactivated during melt extrusion when the phosphorus in the polyester in the second zone is combined with the polyester in the first zone and injection molded into a preform. The resultant preform has much lower acetaldehyde than using a titanium catalyzed polyester resin as it is believed that as a catalyst, the titanium also catalyzes the degradation into acetaldehyde when the polyester is extruded and injection molded into a preform. This differs from the prior art approach as disclosed in, for example, U.S. Pat. No. 7,655,746, where the phosphorus compound is added during melt phase polymerization where it deactivates the titanium. In the prior art approach, the polyester does not receive the full catalytic effect of the titanium catalyst during melt phase polymerization. Because the titanium polycondensation catalyst is deactivated by the phosphorus compound during melt phase polymerization, the catalytic effect of the titanium compound is reduced or lost which leads to longer polymerization times. However, in the current approach the polyester receives the full catalytic effect of the titanium catalyst during melt phase polymerization, reducing the polymerization time, and the phosphorus compound is only added using the compartmentalized pellet during melt extrusion/injection molding.

EXAMPLES

A series of experiments were run demonstrating the use of the compartmentalized pellet with titanium catalyzed polyester resin in a separate zone from the phosphorus for achieving lower acetaldehyde. The materials and processes used, and the results of the experiments are summarized below.

Compositions were produced adding a phosphorus compound to a titanium catalyzed polyester through various means. In one example (Run 1), the phosphorus compound was added directly as a liquid during injection molding. In a separate example (Run 2), the phosphorus compound was added as a masterbatch of the phosphorus compound in polyester which had been crystallized and solid state polymerized. In a separate example (Run 3), the phosphorus compound was added as a masterbatch of the phosphorus compound in a crystallized polyester which had not been solid state polymerized. In the experimental composition (Run 4), a compartmentalized pellet having a core/sheath arrangement with the phosphorus compound in the core was manufactured. Each composition was run at varying levels of phosphorus from the phosphorus compound. The compositions were then injection molded into preforms, and analyzed for acetaldehyde levels. The results of the acetaldehyde tests are described below in Table 1.

PET resin containing 97.9 mol % terephthalic acid and 2.1 mol % isophthalic acid were produced. The melt polymerization catalyst was a citrate chelate titanium catalyst available as Ti AC422 catalyst from Dorf Ketal Chemicals India Private Limited, Maharashtra, India diluted in ethylene glycol to a level of 0.05% added at a level of 7 ppm of titanium. A portion of the PET resin was dried and crystallized under vacuum conditions at 120° C. for 2 hours after which the temperature was increased by 10° C. per hour until the temperature reached 150° C., with the temperature finally being increased to 185° C. for one hour.

For Run 1, the PET resin was crystallized and solid state polymerized ("SSP") in a 3 ft$^3$ dual cone blender under vacuum conditions at 120° C. for two hours, the temperature was then raised by 10° C. per hour until the temperature reached 150° C. before the temperature was raised to a final temperature of 230° C. and polymerized until the desired IV of 0.78 was attained. The resin was then air dried at 350° F. (176.67° C.) for five hours. The PET resin was injection molded into preforms using the injection molding conditions reported below. Phosphorus in the form of triethyl phosphonoacetate ("TEPA") available from TCI America, Portland, Oreg., USA (Product Number D1523) was added to the composition during injection molding as a liquid at the levels reported in Table 1. The phosphorus levels reported in Table 1 are the levels of phosphorus from TEPA added to the final composition.

For Run 2, the PET resin was crystallized and solid state polymerized in a 3 ft³ dual cone blender under vacuum conditions at 120° C. for two hours, the temperature was then raised by 10° C. per hour until the temperature reached 150° C. before the temperature was raised to a final temperature of 230° C. The resin was then air dried at 350° F. (176.67° C.) for five hours. Masterbatches of the phosphorus containing compound having 0.242% by weight TEPA, 0.483% by weight TEPA, 0.966% by weight TEPA and 1.449% by weight TEPA were made by adding the various weight percent of TEPA to the crystallized resin in a twin screw extruder. The masterbatches were crystallized in an oven at 160° C. for thirty minutes and then solid state polymerized in 20 SCFH $N_2$ at 220° C. for twelve and a half hours followed by air drying at 175° C. for five hours in dried air at 16 SCFH. The PET resin (crystallized and solid state polymerized) was blended with the appropriate phosphorus masterbatch (crystallized and solid state polymerized) to achieve the level of phosphorus reported below in Table 1, and injection molded into preforms using the injection molding conditions reported below. The phosphorus levels reported in Table 1 are the levels of phosphorus from TEPA added to the final composition.

For Run 3, the PET resin was crystallized and solid state polymerized in a 3 ft³ dual cone blender under vacuum conditions at 120° C. for two hours, the temperature was then raised by 10° C. per hour until the temperature reached 150° C. before the temperature was raised to a final temperature of 230° C. and polymerized until the desired IV of 0.78 was attained. The resin was then air dried at 350° F. (176.67° C.) for five hours. Masterbatches of the of the phosphorus containing compound having 0.242% by weight TEPA, 0.483% by weight TEPA, 0.966% by weight TEPA and 1.449% by weight TEPA were made by adding the various weight percent of TEPA to the crystallized resin in a twin screw extruder. The masterbatches were crystallized in an oven at 160° C. for thirty minutes and then air dried at 175° C. for five hours in dried air at 16 SCFH. The PET resin (crystallized and solid state polymerized) was blended with the appropriate phosphorus masterbatch (crystallized without solid state polymerization) to achieve the level of phosphorus reported below in Table 1, and injection molded into preforms using the injection molding conditions reported below. The phosphorus levels reported in Table 1 are the levels of phosphorus from TEPA added to the final composition.

For Run 4, the PET resin was formed into a compartmentalized pellet with a core comprising 3% by weight of the pellet and the sheath comprising 97% by weight of the pellet. Phosphorus in the form of TEPA was added to the core at levels of 0.24% by weight TEPA and 0.48% by weight TEPA to achieve the phosphorus levels reported in Table 1. The phosphorus levels reported in Table 1 are the levels of phosphorus from TEPA added to the final composition. The compartmentalized pellets were then crystallized and solid state polymerized ("SSP") in a 3 ft³ dual cone blender under vacuum conditions at 120° C. for two hours, the temperature was then raised by 10° C. per hour until the temperature reached 150° C. before the temperature was raised to a final temperature of 230° C. and polymerized until the desired IV of 0.78 was obtained. The compartmentalized pellets were then air dried at 350° F. (176.67° C.) for five hours. The compartmentalized pellets were then injection molded into preforms using the injection molding conditions reported below.

Note that Run 4 was not produced at 40 ppm phosphorus or 60 ppm phosphorus. Accordingly, those values are reported in Table 1 as N/A (not available).

In all of the runs, the preforms were injection molded using an Arburg 420C injection molding machine having a 30 mm diameter screw having a 23.1 length/diameter ratio rotating at 60 ft/min. 540° F. (282.2° C.) injection molding temperature, 2000 psi back pressure.

After injection molding, the preforms were analyzed for acetaldehyde levels using an Agilent Headspace Autosample HP-7697A and a GC Agilent HP-7890B gas spectrometer equipped with an FID Detector. The acetaldehyde levels of the various runs are reported below in Table 1.

TABLE 1

| | Acetaldehyde Levels | | | |
|---|---|---|---|---|
| Phosphorus addition | Run 1 Liquid | Run 2 Masterbatch (solid stated) | Run 3 Masterbatch (crystallized) | Run 4 BICO (P in core) |
| Acetaldehyde level at 0 ppm P (ppm) | 6.4 | 4.9 | 6.7 | 5.8 |
| Acetaldehyde level at 10 ppm P (ppm) | 6.4 | 6.6 | 5.4 | 5.0 |
| Acetaldehyde level at 20 ppm P (ppm) | 6.6 | 4.4 | 4.9 | 4.3 |
| Acetaldehyde level at 40 ppm P (ppm) | 5.9 | 3.6 | 4.3 | N/A |
| Acetaldehyde level at 60 ppm P (ppm) | 5.3 | 3.6 | 4.0 | N/A |

As can be seen in Table 1, the compartmentalized pellet (Run 4) achieves lower levels of acetaldehyde.

I claim:

1. A process for maintaining the catalytic activity of a catalytic titanium compound in a polyester resin during polymerization comprising the steps of:
   A. melt phase polymerizing a first polyester comprising the catalytic titanium compound in the absence of a deactivating amount of a phosphorus compound,
   B. manufacturing a compartmentalized pellet comprising a first compartmentalized zone and a second compartmentalized zone wherein the first compartmentalized zone comprises the first polyester and the second compartmentalized zone comprises a second polyester comprising a phosphorus compound,
   C. blending the compartmentalized resin pellet into an article by melt mixing and making an article,
   wherein the amount of phosphorus from the phosphorus compound to the amount of titanium from the catalytic titanium compound in step A is in a mole ratio selected from the group consisting of at least 0.1:1.0, at least 0.2:1.0, at least 0.5:1.0, at least 0.7:1.0, and at least 1.0:1.0.

2. The process of claim 1, wherein the second polyester comprises a deactivated titanium compound.

3. The process of claim 1, wherein the titanium from the catalytic titanium compound is present in the first polyester at a level selected from the group consisting of between 2 ppm and 400 ppm, between 2 ppm and 300 ppm, between 2 ppm and 100 ppm, and between 2 ppm and 20 ppm.

4. The process of claim 1, wherein the catalytic titanium compound is selected from the group consisting of titanium alkoxides and their derivatives, titanium complex salts, titanium complexes with hydroxycarboxylic acids, titanium dioxide-silicon dioxide-co-precipitates, and hydrated alkaline or alkaline earth salts-co-titanium dioxide.

5. The process of claim 1, wherein the phosphorus from the phosphorus compound is present in the second polyester at a level selected from the group consisting of between 1 ppm and 20000 ppm, between 1 ppm and 10000 ppm, between 1 ppm and 5000 ppm, between 1 ppm and 1000 ppm, between 1 ppm and 700 ppm, between 1 ppm and 500 ppm, between 1 ppm and 300 ppm, and between 1 ppm and 200 ppm.

6. The process of claim 1, wherein the phosphorus compound is selected from the group consisting of phosphate acids or esters or combinations thereof, phosphite esters, phosphonic acids or esters or combinations thereof, phosphinic acids or esters or combinations thereof, phosphines which do not catalyze the reaction of acetaldehyde with oxygen, phosphine oxide, and phosphorus pentoxide.

7. The process of claim 1, wherein the first polyester and the second polyester are of the same polyester composition.

8. The process of claim 1, wherein the first polyester and the second polyester comprise at least 90% by weight of the compartmentalized pellet.

9. The process of claim 1, wherein the first compartmentalized zone is a sheath and the second compartmentalized zone is a core.

10. The process of claim 9, wherein the core is encapsulated by the sheath.

11. The process of claim 1, wherein the second compartmentalized zone is a sheath and the first compartmentalized zone is a core.

12. The process of claim 11, wherein the core is encapsulated by the sheath.

13. The process of claim 1, wherein the first compartmentalized zone is a first layered sheet and the second compartmentalized zone is a second layered sheet.

14. The process of claim 13, wherein the first layered sheet is next to the second layered sheet.

15. The process of claim 1, wherein the compartmentalized pellet in step B further comprises a third compartmentalized zone wherein the first compartmentalized zone is a first layered sheet, the second compartmentalized zone is a second layered sheet, the third compartmentalized zone is a third layered sheet, the second polyester is present in the second compartmentalized zone and the first polyester is present in the first compartmentalized zone and the third compartmentalized zone.

16. The process of claim 15, wherein the second layered sheet is between the first layered sheet and the third layered sheet.

17. The process of claim 1, wherein the first compartmentalized zone and the second compartmentalized zone are configured in a side-by-side configuration whereby neither compartmentalized zone surrounds the other compartmentalized zone in any plane of the pellet.

18. The process of claim 1, wherein the first compartmentalized zone is void of any deactivated titanium compound.

19. The process of claim 1, wherein the first compartmentalized zone is void of any phosphorus compound.

* * * * *